United States Patent
Kim et al.

(10) Patent No.: US 8,947,435 B2
(45) Date of Patent: Feb. 3, 2015

(54) HOST APPARATUS CONNECTED TO IMAGE FORMING APPARATUS AND INFORMATION DISPLAYING METHOD THEREOF

(75) Inventors: Jung-ha Kim, Suwon-si (KR); Yong-sik Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 630 days.

(21) Appl. No.: 12/923,367

(22) Filed: Sep. 16, 2010

(65) Prior Publication Data

US 2011/0148914 A1    Jun. 23, 2011

(30) Foreign Application Priority Data

Dec. 18, 2009 (KR) .................. 10-2009-0127129

(51) Int. Cl.
*G06T 11/20* (2006.01)
(52) U.S. Cl.
CPC .................... *G06T 11/206* (2013.01)
USPC .......................................... 345/440
(58) Field of Classification Search
USPC .......................................... 345/440
See application file for complete search history.

(56) References Cited

U.S. PATENT DOCUMENTS

| | | | | |
|---|---|---|---|---|
| 5,535,324 A | * | 7/1996 | Alvarez et al. | 715/209 |
| 6,529,217 B1 | * | 3/2003 | Maguire, III et al. | 715/769 |
| 6,901,407 B2 | * | 5/2005 | Curns et al. | 1/1 |
| 7,495,666 B2 | * | 2/2009 | Yu et al. | 345/440 |
| 2002/0165784 A1 | * | 11/2002 | Taggart et al. | 705/26 |
| 2006/0101268 A1 | * | 5/2006 | Cornuejols et al. | 713/173 |
| 2007/0171142 A1 | * | 7/2007 | Ikarashi et al. | 345/4 |
| 2007/0208992 A1 | * | 9/2007 | Koren | 715/503 |
| 2009/0058858 A1 | * | 3/2009 | Yoshikawa | 345/440 |

\* cited by examiner

*Primary Examiner* — Maurice L McDowell, Jr.
*Assistant Examiner* — Kyle Zhai
(74) *Attorney, Agent, or Firm* — Staas & Halsey LLP

(57) ABSTRACT

Disclosed are a host apparatus connected to an image forming apparatus and an information displaying method thereof. An information displaying method of a host apparatus which receives a data of at least one image forming apparatus including: receiving a data of the image forming apparatus; displaying a User Interface (UI) screen including a data area displaying the data by item and a graphic area displaying a graph of the data in the data area; adding a data of an item in the data area to the graphic area; determining whether the data of the item added is graphicalizable; and graphicalizing and displaying the data of the item added in the graphic area according to the determination result. With this, the host apparatus provides a user with convenience in facilitating graph reprocessing and data expansion as the user needs with regard to a web solution or an application to control information of the image forming apparatus.

23 Claims, 13 Drawing Sheets

ANALYSIS RESULTS

GRAPHIC AREA — 40

MODEL NAME
↑ Drag&drop

| SERIAL NUMBER | MAC | NETWORK NAME | MODEL NAME | LOCATION | NUMBER OF PAGES PRINTED |
|---|---|---|---|---|---|
| BE51BPAQ300036.. | 00:15:99:06:C3:40 | 10.88.90.160 | ML-8x00N | MARKETING STRATEGY | 13 |
| BH46BAFQ121273R. | 00:15:99:27:1E:32 | 10.88.55.115 | CLP-300 | | 20 |
| 145TB1CQ300053X | 00:15:99:27:7E:DC | 10.88.55.91 | CLP-660 Series | | 1552 |
| BH51B1CPA00491L | 00:15:99:41:47:46 | 10.88.61.238 | CLP-610 Series | | 441 |
| CGA810932 | 00:80:99:51:13:BD | 10.88.61.84 | SCX-7428 | | 1923 |
| BE51BPAQ300041.. | 00:15:99:06:AC:DE | 10.88.85.160 | ML-8x00N | | 23 |
| BE4381BLB00024H. | 00:15:99:04:4B:0C | 10.88.97.188 | ML-3561N | | 109878 |
| CCD810091 | 00:80:91:51:AA:58 | 10.88.83.177 | SCX-7428 | | 1296 |
| 14L6B1BQA00029K | 00:15:99:44:97:D3 | 10.88.182.84 | SLX-6220 Series | | 260 |
| BE54B1AL70039IF. | 00:00:F0:A6:6D:B3 | 10.88.169.105 | ML-3050 Series | | 947 |
| 145TB1CQ300021M | 00:15:99:42:AE:76 | 10.88.203.170 | CLP-705 Series | | 1932 |

ANALYSIS RESULTS

GRAPHIC AREA — 40

Drag&drop → MODEL NAME

| SERIAL NUMBER | MAC | NETWORK NAME | MODEL NAME | LOCATION | NUMBER OF PAGES PRINTED |
|---|---|---|---|---|---|
| BE51BPAQ300036.. | 00:15:99:06:C3:40 | 10.88.90.160 | ML-8x00N | MARKETING STRATEGY | 13 |
| BH46BAFQ121273R. | 00:15:99:27:1E:32 | 10.88.55.115 | CLP-300 | | 20 |
| 145TB1CQ300053X | 00:15:99:27:7E:DC | 10.88.55.91 | CLP-660 Series | | 1552 |
| BH51B1CPA00491L | 00:15:99:41:47:46 | 10.88.61.238 | CLP-610 Series | | 441 |
| CGA810932 | 00:80:99:51:13:BD | 10.88.61.84 | SCX-7428 | | 1923 |
| BE51BPAQ300041.. | 00:15:99:06:AC:DE | 10.88.85.160 | ML-8x00N | | 23 |
| BE4381BLB00024H. | 00:15:99:04:4B:0C | 10.88.97.188 | ML-3561N | | 109878 |
| CCD810091 | 00:80:91:51:AA:58 | 10.88.83.177 | SCX-7428 | | 1296 |
| 14L6B1BQA00029K | 00:15:99:44:97:D3 | 10.88.182.84 | SLX-6220 Series | | 260 |
| BE54B1AL70039IF. | 00:00:F0:A6:6D:B3 | 10.88.169.105 | ML-3050 Series | | 947 |
| 145TB1CQ300021M | 00:15:99:42:AE:76 | 10.88.203.170 | CLP-705 Series | | 1932 |

30

31

HOST APPARATUS CONNECTED TO IMAGE FORMING APPARATUS AND INFORMATION DISPLAYING METHOD THEREOF

CROSS-REFERENCE TO RELATED APPLICATIONS

This application claims priority from Korean Patent Application No. 10-2009-0127129, filed on Dec. 18, 2009 in the Korean Intellectual Property Office, the disclosure of which is incorporated herein by reference.

BACKGROUND

1. Field

Apparatuses and methods consistent with the exemplary embodiments relate to a host apparatus connected to an image forming apparatus and an information displaying method thereof, and more particularly, to a host apparatus which graphicalizes data of an image forming apparatus via user's manipulation such as drag-and-drop and an information displaying method thereof.

2. Description of the Related Art

An image forming apparatus forms an image printed on paper. The image forming apparatus may be realized by a printer, a copy machine, a fax, a multi-functional device having two or more functions, etc.

In recent years, there has been an increasing demand for an image forming apparatus as office automation equipment such as a multi-functional device which not only serves a printing function to output a document but also functions as a scanner, a fax, or the like. Thus, the image forming apparatus is being gradually developed into a high-performance device by expanding its own functions to carry out a variety of roles, and available functions of the image forming apparatus may be limited by authority of a user which is set up.

Accordingly, in order to effectively control an image forming apparatus connected via a network, a user (or an administrator) receives various data about each device, i.e., the image forming apparatus, and controls it using a host apparatus, such as a personal computer (PC).

To this end, a web solution or an application may be installed in the host apparatus to provide a user with a variety of data of an image forming apparatus. The user checks out information of the image forming apparatus using the web solution installed, and data is graphicalized (converted into a computer illustration) to be provided to the user.

However, in the case of a conventional web solution or application, a graph in a predetermined format is provided, and thus a user has difficulty in reprocessing a graph as necessary and there are limitations in expanding the data.

SUMMARY

Accordingly, one or more embodiments provide a host apparatus connected to an image forming apparatus and an information displaying method thereof which provides a user with convenience in facilitating graph reprocessing and data expansion as the user needs with regard to a web solution or an application to control information of the image forming apparatus.

The foregoing and/or other aspects may be achieved by providing an information displaying method of a host apparatus which receives a data of at least one image forming apparatus including: receiving a data of the image forming apparatus; displaying a User Interface (UI) screen including a data area displaying the data by item and a graphic area displaying a graph of the data in the data area; adding a data of an item in the data area to the graphic area; determining whether the data of the item added is graphicalizable; and graphicalizing and displaying the data of the item added in the graphic area according to the determination result.

The data area may display the received data of the image forming apparatus as at least one column corresponding to the item, and the adding to the graphic area includes transferring one of at least one column to the graphic area by a user, for example (drag-and-drop).

The information displaying method may further include: determining whether there is a graph in the graphic area; and determining whether the data of the item added and the graph present in the graphic area can be grouped if a graph is present, wherein the displaying in the graphic area may include displaying the present graph and a graph of the added data via integration if the grouping is possible.

The displaying in the graphic area may include selecting whether to divide the graphic area if the grouping is impossible.

The displaying in the graphic area may include dividingly displaying the present graph and the graph of the added data according to the selecting whether to divide.

The information displaying method may further include determining whether the data of the present graph and the added data can be linked, wherein the dividingly displaying may include displaying the present graph and the graph of the added data to be linked according to the determination result.

The displaying in the graphic area may include renewing the present graph to the graph of the added data and displaying according to the selecting whether to divide.

The determining whether grouping is possible and the determining whether linking is possible may include loading a conditional data on whether grouping and linking are possible and determining on the basis of the loaded conditional data.

The determining whether graphicalization is possible may include loading a conditional data on graphicalization is possible and determining on the basis of the loaded conditional data.

Another aspect is achieved by providing a host apparatus in which a web solution is installed to control at least one image forming apparatus including: a user input unit input with a selection by a user; a communication unit to receive a data of the image forming apparatus; a storage unit to store the data of the image forming apparatus; a display to display a User Interface (UI) screen including a data area to display the data by item and a graphic area to display a graph of the data in the data area; and a controller to determine whether a data of an added item can be graphicalized and controlling the display to display the data of the added item via graphicalization according to a determination result if receiving selection by a user that the data of the item in the data area is added to the graphic area.

The data area may display the received data of the image forming apparatus as at least one column corresponding to the item, and the user input unit may select to transfer one of at least one column to the graphic area via drag-and-drop, for example.

The controller may determine whether there is a graph in the graphic area, if a graph is present, determine whether the data of the added item and the graph present in the graphic area can be grouped, and if the grouping is possible, control the display to display the present graph and the graph of the added data via integration in the graphic area.

The controller may control the display to display a message to select whether to divide the graphic area if the grouping is impossible.

The display may dividingly display the present graph and the graph of the added data in the graphic area according to selection of whether to divide.

The controller may determine whether the data of the present graph and the added data can be linked and display the present graph and the graph of the added data to be linked in the graphic area according to a determination result.

The display may renew the present graph to the graph of the added data and display according to selection of whether to divide.

The storage unit may store a conditional data on whether preset grouping and preset linking are possible, and the controller may load the conditional data on whether preset grouping and preset linking are possible and determine whether grouping and linking are possible on the basis of the loaded conditional data.

The storage unit may store a conditional data on whether preset graphicalization is possible, and the controller may load the conditional data on whether graphicalization is possible and determines whether graphicalization is possible on the basis of the loaded conditional data.

The communication unit may communicate with a server in which the data of the image forming apparatus is stored, and the controller may control the communication unit to load a preset conditional data on whether grouping and liking are possible from the server and determines whether grouping and linking are possible on the basis of the loaded conditional data.

The communication unit may communicate with a server in which the data of the image forming apparatus is stored, and the controller may load a preset conditional data on whether graphicalization is possible from the server and determines whether graphicalization is possible on the basis of the loaded conditional data.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 3, 4, 6, 7 to 9, and 11 illustrate an example of a UI screen including a data area and a graphic area of a host apparatus according to the embodiment.

DETAILED DESCRIPTION

Figure 1:
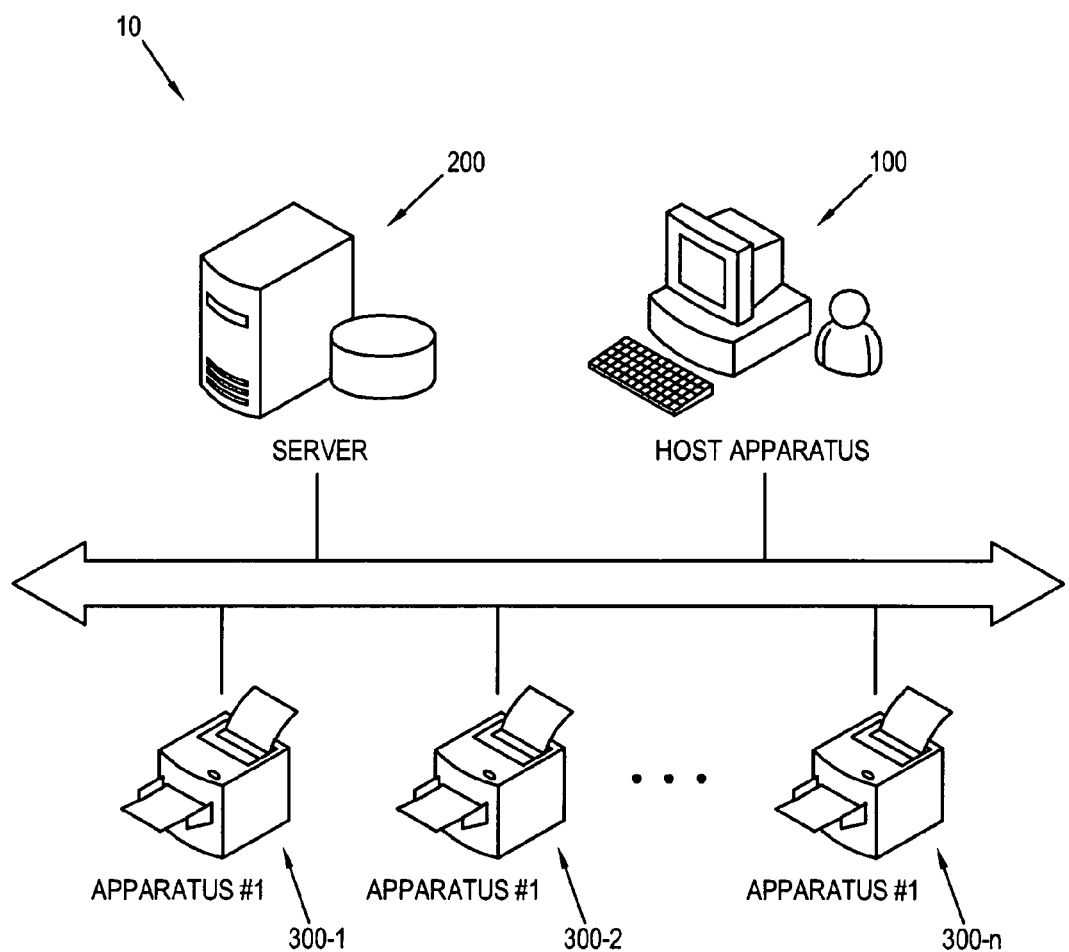
FIG. 1 schematically illustrates a configuration of an image forming system according to one embodiment.

Below, embodiments will be described in detail with reference to accompanying drawings so as to be easily realized by a person having ordinary knowledge and/or skill in the art. The embodiments may be embodied in various forms without being limited to the exemplary embodiments set forth herein. Descriptions of well-known parts are omitted for clarity, and like reference numerals refer to like elements throughout.

Figure 2:
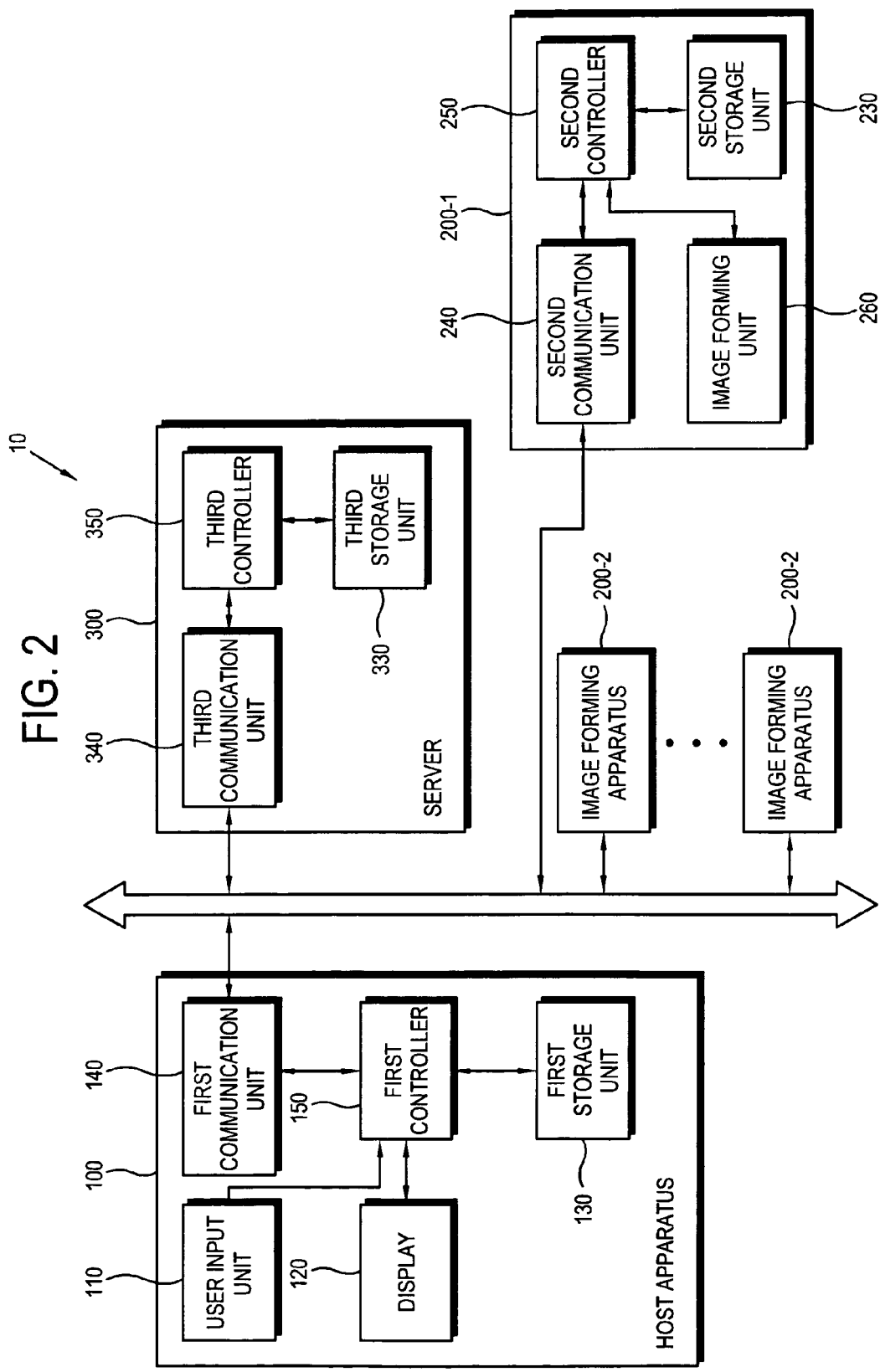
FIG. 2 is a block diagram illustrating the configuration of the image forming system according to the embodiment.

FIG. 1 schematically illustrates a configuration of an image forming system 10 according to one embodiment, and FIG. 2 is a block diagram illustrating the configuration of the image forming system 10 according to the embodiment.

As shown in FIG. 1, the image forming system 10 includes a host apparatus 100, a server 200, and at least one image forming apparatus 300-1, 300-2, . . . , and 300-n. Here, the server 200 may be provided independently, included in the host apparatus 100, or omitted.

In one embodiment, if the server 200 is omitted, the host apparatus 100 is connected to at least one image forming apparatus 300-1, 300-2, . . . , and 300-n to receive various informational data therefrom.

The host apparatus 100 may be realized by a PC or the like, and the image forming apparatus 300-1, 300-2, . . . , and 300-n includes an image forming unit which performs printing according to a printing instruction and is realized by a printer connected via a network, local, universal serial bus (USB), parallel, universal naming convention (UNC), or a multifunctional device serving at least two functions.

Here, printing includes printing a scanned document for copy, printing a received fax data, and printing a data received from the outside via a user PC such as the host apparatus 100 or stored in a hard disk drive (HDD) of the image forming apparatus 300-1, 300-2, . . . , and 300-n or an external memory (USB memory).

Meanwhile, the image forming apparatus 300-1, 300-2, . . . , and 300-n may be locally connected to the host apparatus 100 or may be shared in a network as a network image forming apparatus having an independent IP address.

In the case the image forming apparatus 300-1, 300-2, . . . , and 300-n are locally connected to the host apparatus 100, the host apparatus 100 may include the server 200.

Further, in the case the image forming apparatus 300-1, 300-2, . . . , and 300-n is a network image forming apparatus, the server 200 is independently provided to control the image forming apparatus 300-1, 300-2, . . . , and 300-n, and the host apparatus 100 receives various information on the image forming apparatus 300-1, 300-2, . . . , and 300-n from the server 200. Here, the server 200 may include a second storage unit 230 storing data received from the image forming apparatus 300-1, 300-2, . . . , and 300-n, a second communication unit 240 communicating with the image forming apparatus 300-1, 300-2, . . . , and 300-n and the host apparatus 100, and a second controller 250 controlling the second storage unit 230 to store data received through the second communication unit 240 and the second communication unit 240 to send stored data to the host apparatus 100.

According to an embodiment, a web solution is installed as an illustrative example of integrated application software in order that the host apparatus 100 controls the image forming apparatus 300-1, 300-2, . . . , and 300-n, and the integrated application software may further include a printer driver (or a universal printer driver) to use the image forming apparatus 300-1, 300-2, . . . , and 300-n according to the kind of the image forming apparatus 300-1, 300-2, . . . , and 300-n, an application for expanding a function of the image forming apparatus 300-1, 300-2, . . . , and 300-n, etc.

According to the embodiment, the web solution installed in the host apparatus 100 controls various data received the server 200 or the image forming apparatus 300-1, 300-2, . . . , and 300-n. However, it is also understood that any other solution than the web solution can be installed in the host apparatus.

As shown in FIG. 2, the host apparatus 100 includes a user input unit 110, a display 120, a first storage unit 130, a first communication unit 140, and a first controller 150.

The user input unit 110 receives input or selection of various instructions from a user.

Specifically, the user input unit 110 selects execution of the web solution controlling a device, i.e., the image forming apparatus 300-1, 300-2, . . . , and 300-*n*, and selects addition of data by items in a data area 30 (see FIG. 3) on a UI screen displayed on the display 120, mentioned later, to a graphic area 40 corresponding to the execution of the web solution. Here, the user input unit 110 may receive user's selection via drag-and-drop.

Meanwhile, a user logs in the web solution through the user input unit 110. Here, the user may closeup in an administrator mode which allows the user to setup and change all configuration of the image forming apparatus 300-1, 300-2, . . . , and 300-*n* without any limitation of access in the host apparatus 100.

For this, the user input unit 110 is input with an administrator ID and a password from the user for login in the administrator mode. The first controller 150 confirms the user as a system administrator through the administrator ID and the password. In an embodiment, the user includes an administrator.

The first user input unit 110 may include a keyboard, a mouse, etc., which are provided as an input device of the host apparatus 100, and may include graphic user interface (GUI, hereinafter, also referred to as "user interface (UI)") generated by execution of a driver or an application and displayed on the display 120 for a user to input or select through. In an embodiment, the GUI includes an icon, button, text input box, etc., which enables user's selection.

The display 120 displays a user interface (UI) screen including the data area 30 and the graphic area 40, shown in FIGS. 3, 4, 6, 7 to 9, and 11, as a screen to control the image forming apparatus 300-1, 300-2, . . . , and 300-*n* connectable thereto. Here, the data area 30 may display a variety of data of the image forming apparatus in a table, chart, grid, etc. by items. The graph area 40 may dividingly display a plurality of graphs. However, the data area and the graphic area can vary, or overlap Furthermore, the display 120 may display a message 50 and 60 regarding graphicalization of a data shown FIGS. 5 and 10 to the user. Here, the message 50 and 60 includes a UI button through which to receive user's selection, and the user input unit 110 receives user's selection related to graphicalization of a data, grouping graphs, dividing a graph, etc. using the displayed UI button.

The display 120 may include a liquid crystal display (LCD) and a driver (not shown) to drive the LCD.

The first storage unit 130 stores a data about at least one image forming apparatus 300-1, 300-2, . . . , and 300-*n* received from the server 200 or the image forming apparatus 300-1, 300-2, . . . , and 300-*n*.

Here, the data stored in the first storage unit 130 includes a data of the image forming apparatus by items, a conditional data about whether it is possible to predeterminedly graphicalize each item, and a conditional data about whether it is possible to predeterminedly group and link each item.

Specifically, the data of the image forming apparatus by items may include at least one of a serial number, an MAC address, a network name, a model name, and location of at least one image forming apparatus 300-1, 300-2, . . . , and 300-*n* connectable with the host apparatus 100 or the server via a network.

The first storage unit 130 stores the data of the image forming apparatus 300-1, 300-2, . . . , and 300-*n* by items, mentioned above, and a conditional data about whether it is possible to graphicalize each item.

The conditional data about whether graphicalization is possible may be stored in Table 1 shown below.

TABLE 1

|  | Serial no. | MAC | Network | Model Name | Location | Number of pages printed |
|---|---|---|---|---|---|---|
| Graphicalization | X | X | ○ | ○ | ○ | X |

According to an embodiment with reference to Table 1, data of each image forming apparatus corresponding to a network name, a model name, and location may be graphicalized.

When a user selects to add of an item of the data area 30 to the graphic area 40 using drag-and-drop on a UI screen, the first controller 150 controls the display 120 to display a graph generated on the basis of the conditional data about whether graphicalization is possibly stored in the fist storage unit 130 in the graphic area 40. Here, a graph type (a bar graph, a pie chart, etc.) may be set up by a user in advance and stored in the first storage unit 130. However, it is also understood that the user selects an item and moves the selected item to a predetermined area to display in a visual form (for example, a bar bowl graph, a pie chart, etc.)

The conditional data about whether grouping and linking are possible may be stored in Table 2 shown below.

TABLE 2

|  | No | S/N | Status | IP Address | Model Name | Location | Department | Date |
|---|---|---|---|---|---|---|---|---|
| No | 0 | 0 | 0 | 0 | 0 | 0 | 0 | 0 |
| S/N | 0 | 0 | 0 | 0 | 0 | 0 | 0 | 0 |
| Status | 0 | 0 | 0 | 0 | 2 | 2 | 2 | 0 |
| IP Address | 0 | 0 | 0 | 0 | 0 | 0 | 0 | 0 |
| Model Name | 0 | 0 | 2 | 0 | 0 | 2 | 2 | 0 |
| Location | 0 | 0 | 2 | 0 | 1 | 0 | 1 | 0 |
| Department | 0 | 0 | 2 | 0 | 1 | 2 | 0 | 0 |
| Date | 0 | 0 | 0 | 0 | 1 | 1 | 1 | 0 |

According to an embodiment with reference to Table 2, the row may represent an existing data item, and the column may represent a data item newly added. The first storage unit 130 stores conditions about grouping or liking possibility of a plurality of graphs regarding the data of the image forming apparatus by items in a matrix format as Table 2.

Here, the number "1" represents a case where grouping is possible, and the number "2" represents a case where linking is possible in Table 2.

For example, in the case data can be grouped into an item such as location and a model name, the first controller 150 integrates a plurality of graphs into one graph and displays it in the graphic area 40.

Further, in the case data can be linked as an item such as a model name and a status, the first controller 150 divides the graphic area 40 and displays a plurality of graphs in divided areas, respectively, and a graph in each area is linkable according to a user's selection.

The first storage unit 130 may be realized by internal or external storage modules such as an HDD, a flash memory, etc. However, it is not limited thereto. User information stored in the first storage unit 130 of the host apparatus 100 according to the embodiment may include store authorization information for confirmation in an administrator mode or by the user.

Meanwhile, the first storage unit 130 further stores program information to execute the web solution currently installed in the host apparatus 100.

When the web solution is executed, the controller 150 controls the first communication unit 140 to receive a data of an image forming apparatus from an external device (the server 200) or at least one image forming apparatus 300-1, 300-2, ..., and 300-n and stores a received data in the first storage unit 130.

Further, when a function of generating a graph about a data of an image forming apparatus is selected in the web solution, the first controller 150 controls the display 120 to load a stored data and to display a UI screen including the data area 30 and the graphic area 40.

Here, the first communication unit 140 receives a data directly from at least one connectable image forming apparatus 300-1, 300-2, ..., and 300-n or a data of an image forming apparatus from the server 200 which stores a data of each (or some) image forming apparatus.

The reception of a data may be conducted by user's selection of executing the web solution or periodically (or non periodically) by a predetermined reserved time.

The first communication unit 140 communicates with at least one image forming apparatus 300-1, 300-2, ..., and 300-n, the server 200, etc., and may be realized by a cable or wireless communication module connected locally or via a network according to a protocol with an external device, e.g., the image forming apparatus 300-1, 300-2, ..., and/or 300-n or the server 200.

The first controller 150 controls the host apparatus 100 overall. The first controller 150 may be realized in a combination of software such as a web solution firmware, etc. and hardware such as a central processing unit (CPU).

Specifically, the first controller 150 connects to at least one of image forming apparatus 300-1, 300-2, ..., and 300-n or the server 200 via the first communication unit 140 responding to execution of the web solution, and receives and stores a data of the image forming apparatus 300-1, 300-2, ..., and 300-n in the first storage unit 130.

Here, the stored data of the image forming apparatus may include data of each (or some) image forming apparatus by items, conditional data about whether graphicalization by items is possible as in Table 1, and conditional data about whether grouping and linking are possible as in Table 2.

Moreover, as necessary, the conditional data about whether graphicalization by items is possible as in Table 1 and the conditional data about whether grouping and linking are possible as in Table 2 may be stored in advance in the first storage unit 130.

Further, in the case of the server 200, which is provided independently, when receiving user's selection of graphicalizing a certain item, the first controller 150 controls the first communication unit 140 to load conditional data about whether graphicalization by items is possible and conditional data about whether grouping and linking are possible stored in the server 200 and the display 120 to display the loaded conditional via graphicalization.

When a function of generating a graph of a data of an image forming apparatus is selected via the user input unit 110 while the web solution is executed, the first controller 150 controls the display 120 to display a UI screen including the data area 30 and the graphic area 40 as shown in FIG. 3.

As shown in FIG. 3, the data area 30 displays a data of an image forming apparatus as at least one column corresponding to at least one item. Here, the data area 30 may display a data of an image forming apparatus in each item in a grid format.

A user may select any one item in the data area 30 of FIG. 3 to be graphicalized and added to the graphic area 40.

Here, the user selects a column 31 corresponding to an item to be added and transfers it to the graphic area 40 by drag-and-drop.

Meanwhile, the host apparatus 100 of an embodiment may be realized as follows: a user selects any one item, i.e., the column 31, and selects an add button, which is separately provided on the UI screen of FIG. 3, thereby displaying a data of the selected column as a graph in the graphic area 40.

Figure 4:
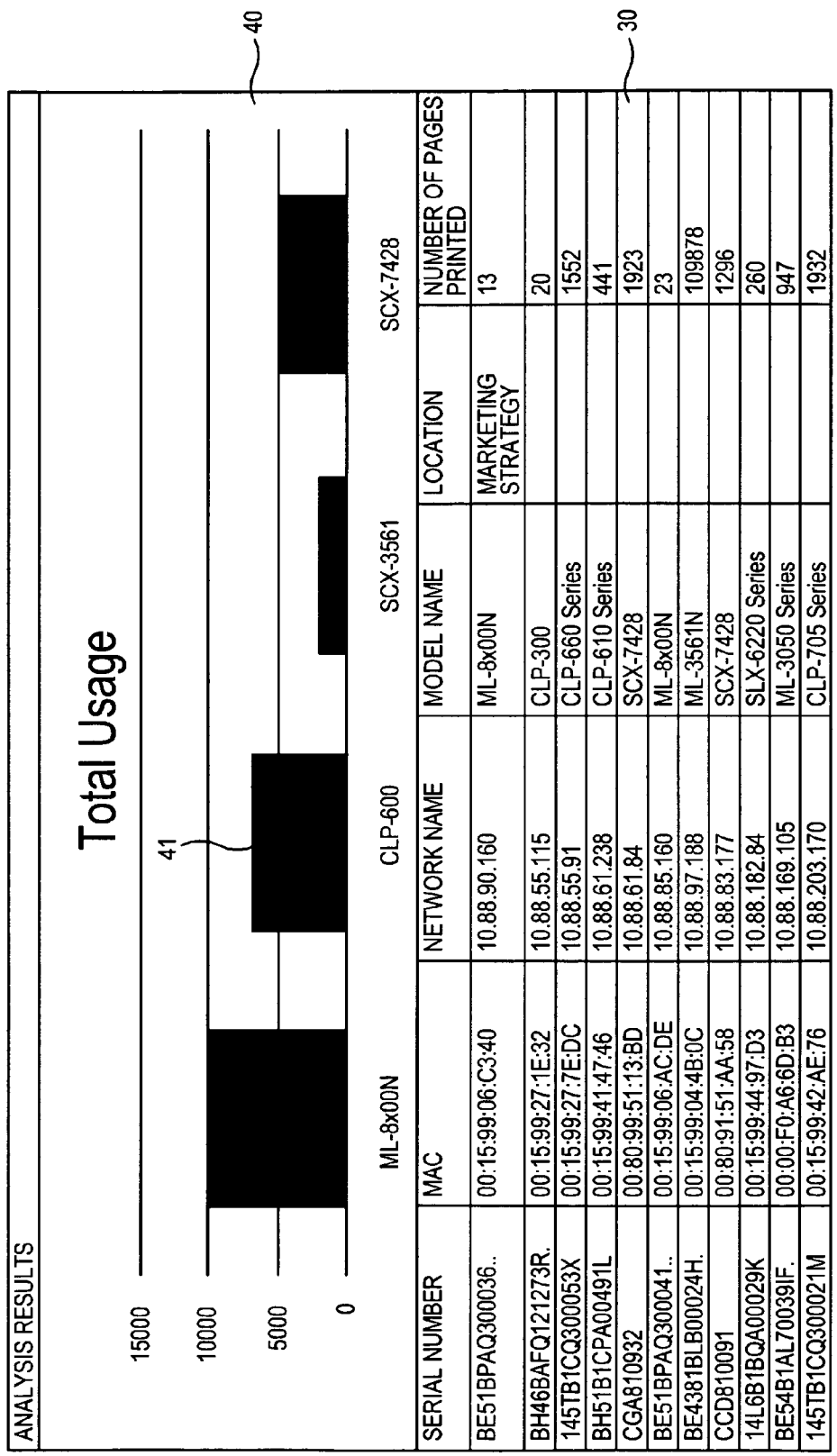

In FIG. 3, when any one item is selected to be graphicalized, the first controller 150 may control the display 120 to generate a data of an item 31 selected as in FIG. 4 into a graph according to the conditional data on whether graphicalization is possibly stored in the first storage unit 130 (refer to Table 1) and to display it in the graphic area 40. That is, numerical data is converted into a graphical visual form.

Here, if the selected item 31 is set up to be graphicalizable in the conditional data of Table 1, the first controller 150 controls the display 120 to generate and display a graph as shown in FIG. 4.

For example, if a user selects the item 31 of a model name, information about usage of each model is displayed in the graphic area 40.

Figure 5:
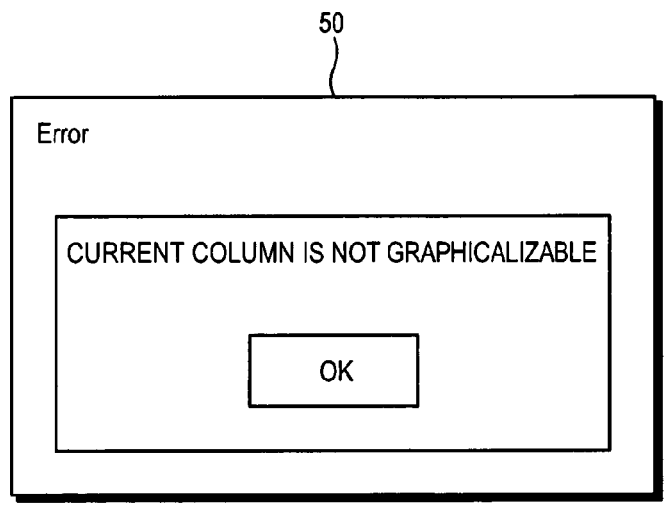
FIGS. 5 and 10 illustrate an example of a message regarding graphicalization according to the embodiment.

Furthermore, if the selected item 31 is set up to be not graphicalizable in the conditional data of Table 1, the first controller 150 controls the display 120 to generate and display a message 50 that graphicalization is impossible as shown in FIG. 5. When the user selects an OK button 51 corresponding to the message 50 of FIG. 5, the first controller 150 controls the display 120 so that the UI screen goes back to the previous screen as in FIG. 3.

Meanwhile, in the case the conditional data on whether graphicalization is possible as in Table 1 is stored in the server 200, which is provided separately, when a user selects any one item 31 to be graphicalized in FIG. 3, the first controller 150 controls the first communication unit 140 to load the conditional data on whether graphicalization is possible from the server 200 and the display 120 to display a UI in FIG. 4 or 5 on the basis of the loaded conditional data.

Figure 6:
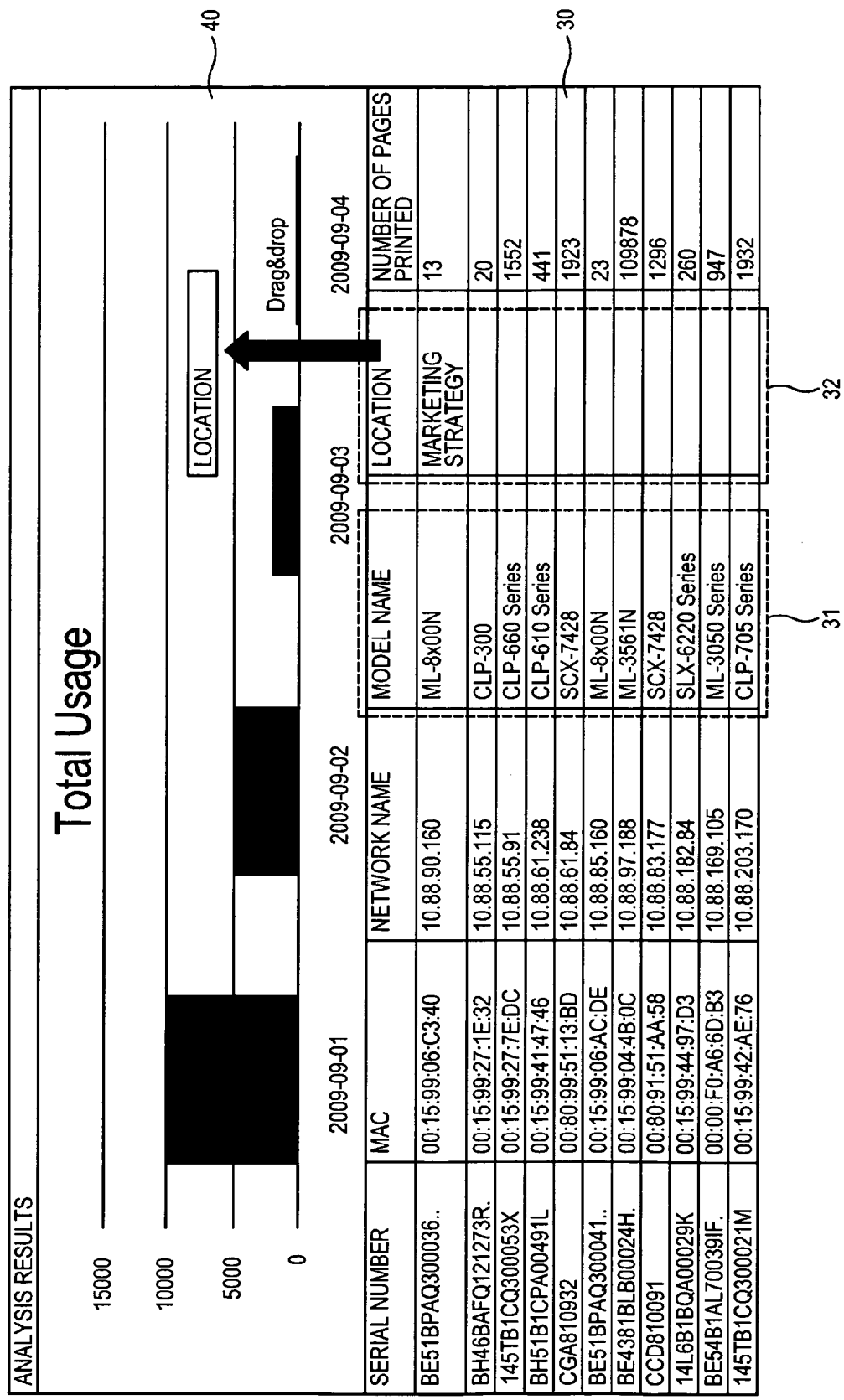

Meanwhile, the user may select any one item in the data area 30 to be graphicalized and added to the graphic area 40 in the state where a data of an image forming apparatus regarding any one item is graphicalized and present in the graphic area 40, as shown in FIG. 6.

Here, the user selects a column 32 corresponding to an item to be added and transfers it to the graphic area 40 by drag-and-drop.

Figure 7:
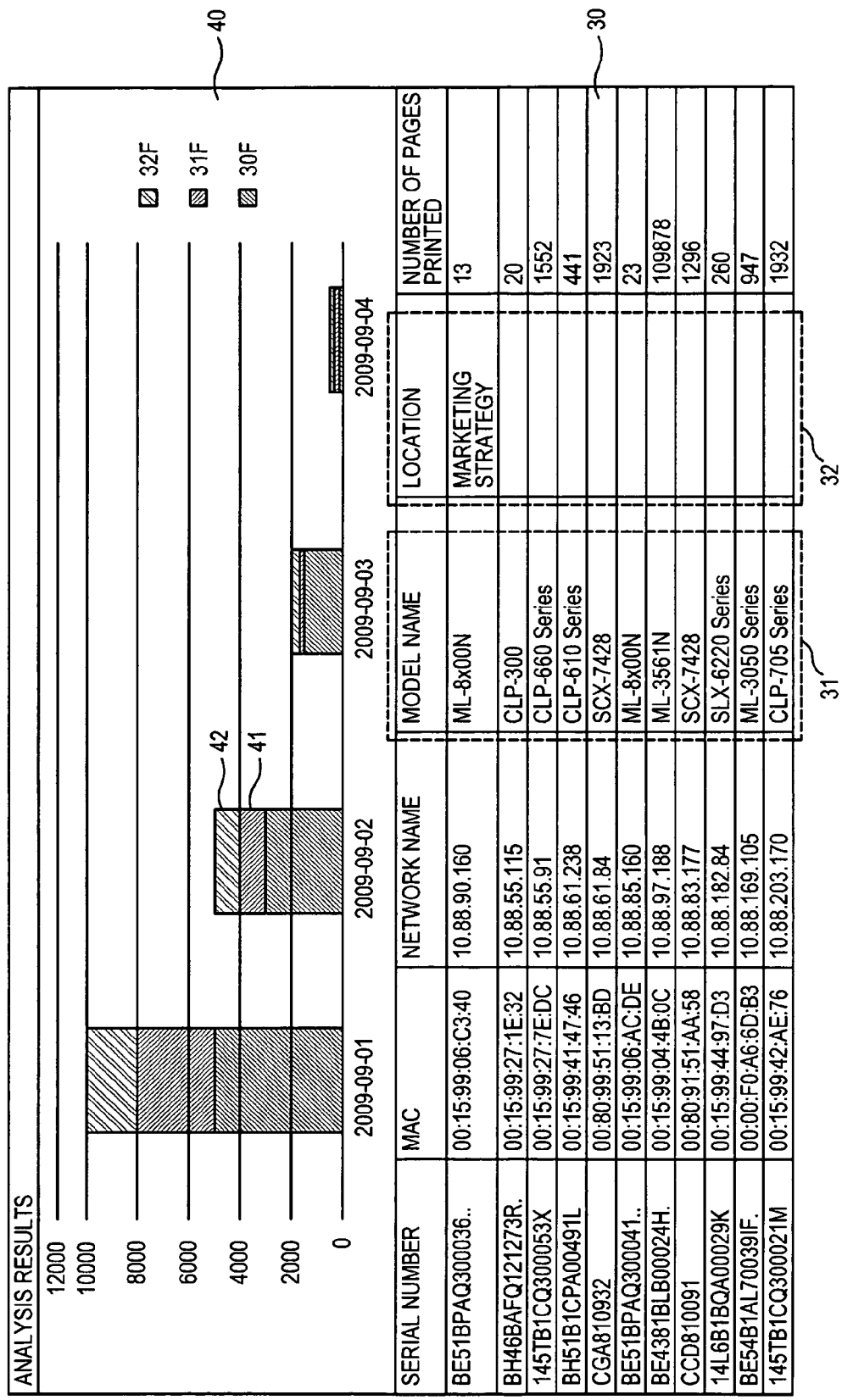

The first controller 150 determines whether a data of an existing graph and a data of a newly added item can be grouped according to the conditional data about whether grouping and linking are possibly (refer to Table 2) stored in the first storage unit 130, and controls the display 120 to generate and display an integrated graph in the graphic area 40, as shown in FIG. 7.

For example, if a location item 32 is selected to be graphicalized in the presence of a graph about usage information by dates in the graphic region 40, as shown in FIG. 6, the first controller 150 makes certain that the date and location items can be grouped, i.e., are set up to "1," in the conditional data of Table 2 and controls the display 120 to generate and display an integrated graph showing usage information by dates and locations, as shown in FIG. 7.

Figure 8:
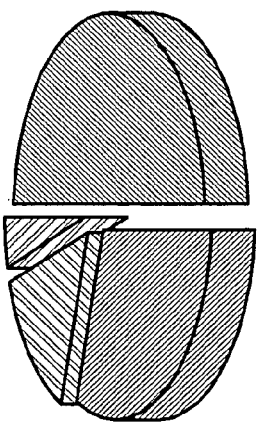

Moreover, the user may select any one item in the data area 30 to be graphicalized and added to the graphic area 40 even in the state where a data of an image forming apparatus regarding any one item is graphicalized and present in the graphic area 40, as shown in FIG. 8.

Figure 9:
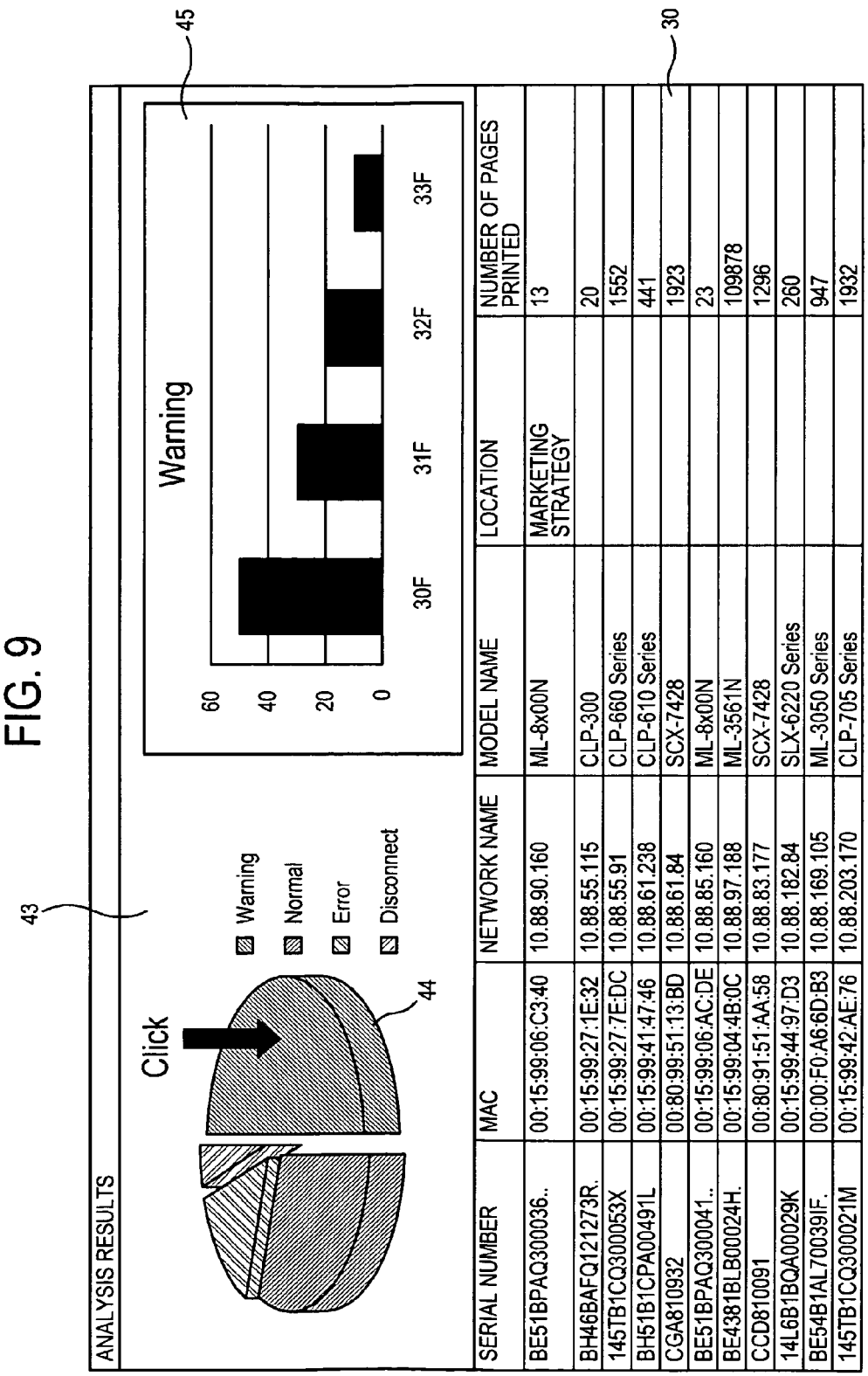

The first controller 150 determines whether a data of an existing graph and a data of a newly added item can be grouped according to the conditional data about whether grouping and linking are possible (refer to Table 2) stored in the first storage unit 130, divides the graphic area 40 into a first area 43 and a second area 45, and controls the display 120 to generate and display the existing graph (a first graph) and a graph of the newly added data (a second graph) in the first area 43 and the second area 45, respectively, as shown in FIG. 9.

For example, if the location item 32 is selected to be graphicalized in the presence of a graph about a status of an image forming apparatus in the graphic region 40, as shown in FIG. 8, the first controller 150 makes certain that the status and location items can be grouped, i.e., are set up to "2," in the conditional data of Table 2 and controls the display 120 to display two graphs showing status information and status information by locations in the divided graphic areas 43 and 45, respectively, as shown in FIG. 9.

Here, if the user selects any one state, e.g., a warning 44, from the first graph of the first area 43, as shown in FIG. 9, the first controller 150 may display the second graph indicating location information about the selected state in the second area 45.

Likewise, if the user selects any one state, e.g., an error 46, from the first graph of the first area 43, as shown in FIG. 9, the first controller 150 may display the second graph indicating location information about the selected state in the second area 45.

Thus, if two graphs are set up to be linked, the user can make sure the second graph dynamically changes according to a condition selected in the first graph.

Figure 10:
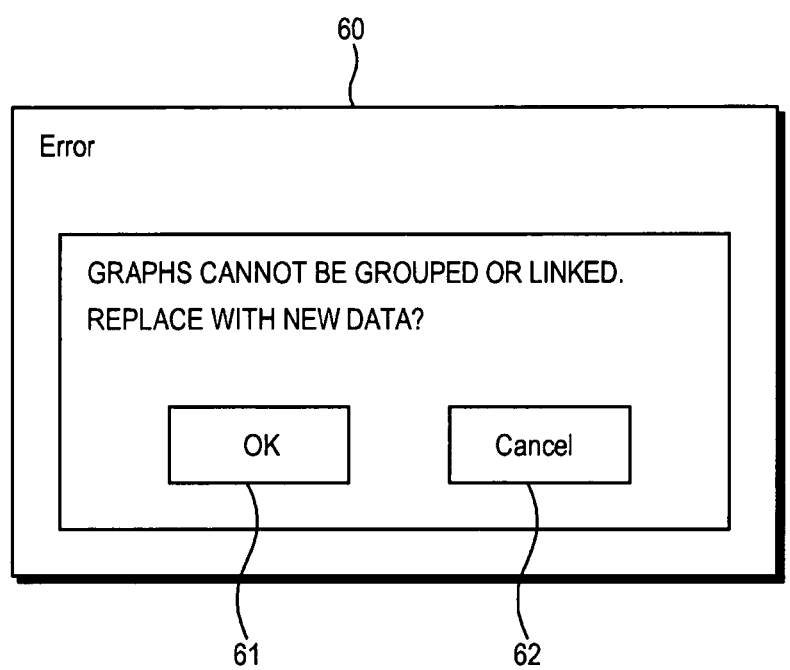

Meanwhile, if the item 32 selected in FIG. 6 or 8 can not be grouped or linked, i.e., set up to "0" in the conditional data of Table 2, the first controller 150 controls the display 120 to generate and display a message 60 indicating that grouping and linking are impossible, as shown in FIG. 10.

The message 60 of FIG. 10 may include buttons 61 and 62 to select whether to replace the graphic area 40 with a graph of a data corresponding to the newly selected item 32.

Figure 11:
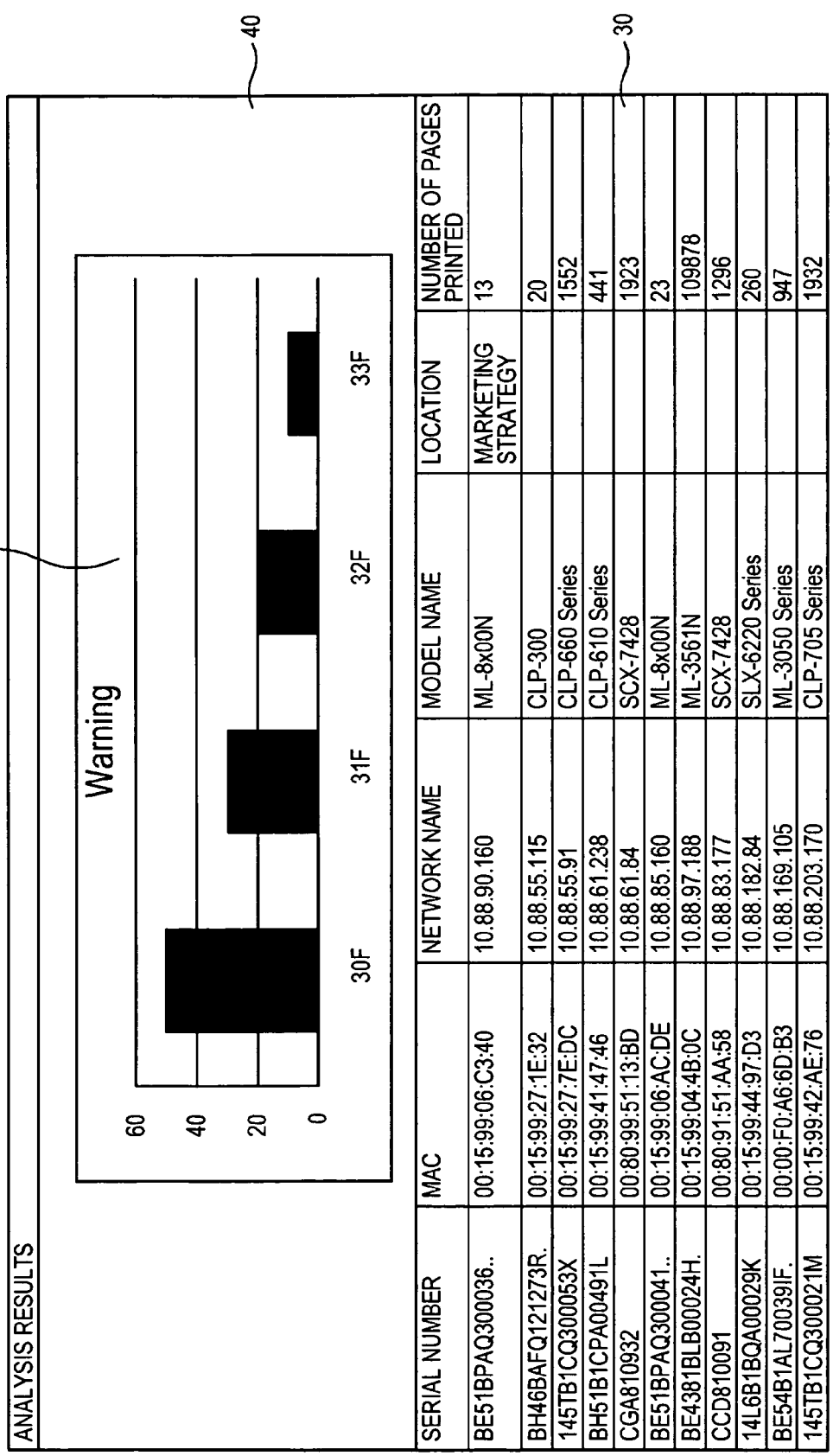

If the user selects an OK 61 to replace with the new data through the message 60 of FIG. 10, the first controller 150 determines whether the newly selected item 32 is graphicalizable with reference to the information of Table 1, and controls the display 120 to generate and display a new graph accordingly, as shown in FIG. 11.

If the user selects a cancel 62 to maintain an existing graph through the message 60 of FIG. 10, the first controller 150 controls the display 120 to keep an existing graph displayed, as shown in FIG. 6 or 8.

Meanwhile, the host apparatus 100 of an embodiment may be realized to divide the graphic area 40 into the first area 43 and the second area 45 and to display an existing graph and a graph of the newly selected item 32, respectively, even if the newly selected item 32 in FIG. 6 or 8 cannot be grouped and linked with the existing graph.

Here, the display 120 may display a message to select one of displaying a plurality in the graphic area 40 divided, replacing with a new graph, and maintaining an existing graph.

Meanwhile, if the conditional data on whether grouping and linking are possibly as in Table 2 is stored in the server 200, which is provided separately, when a user selects any one item 32 to be added in FIG. 6 or 8, the first controller 150 controls the first communication unit 140 to load the conditional data on whether grouping and linking are possible from the server 200 and the display 120 to display a UI of any of FIGS. 7, 9 and 10 on the basis of the loaded conditional data.

Accordingly, the host apparatus 100 displays a data of an image forming apparatus by items easily graphicalized by integrated application software such as the web solution and makes sure a plurality of items by dynamically changing them according to whether grouping or linking is possible, thereby providing a user with facilitation in controlling the image forming apparatus.

Hereinafter, a process of the host apparatus 100 displaying information in the image forming system 10 with the foregoing configuration will be described with reference to FIG. 12.

Figure 12:
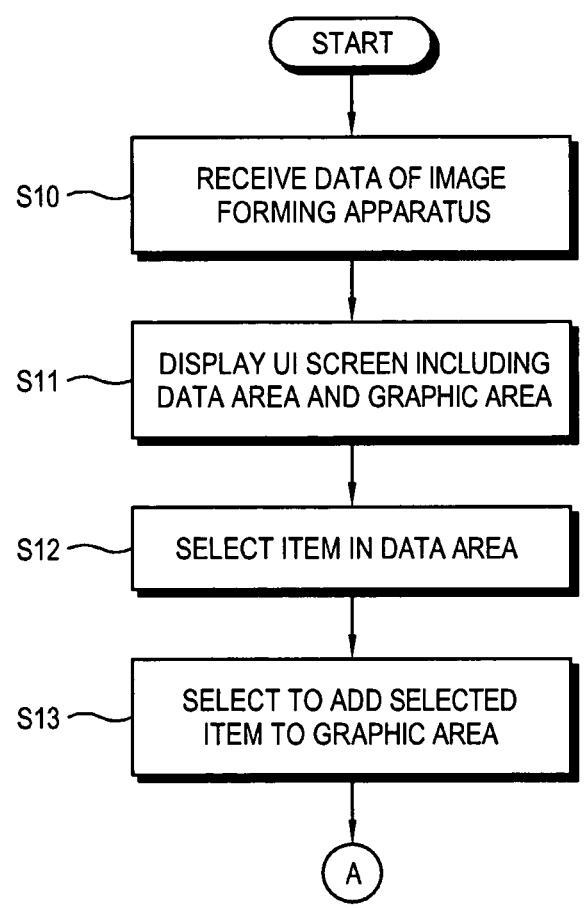
FIGS. 12 and 13 are a flow chart illustrating an information offering method of the host apparatus according to the embodiment.

As shown in FIG. 12, the host apparatus 100 receives a data of the image forming apparatus 300-1, 300-2, . . . , and 300-*n* from at least one connectable image forming apparatus 300-1, 300-2, . . . , and 300-*n* or the server 200 (S10). Here, the host apparatus 100 may receive a data of the image forming apparatus 300-1, 300-2, . . . , and 300-*n* responding to execution of the web solution.

The host apparatus 100 displays a UI screen including the data area 30 and the graphic area 40 on the display 120 on the basis of the received data at S10 (S11).

A user selects any one item in the data area 30, i.e., a column, on the UI screen displayed at S11 (S12).

The user selects addition of the item selected at S12 to the graphic area 40 (S13). Here, the user transfers the column selected at S13 to the graphic area 40 by drag-and-drop to be added to the graphic area 40. However, the selected method is not limited thereto.

Figure 13:
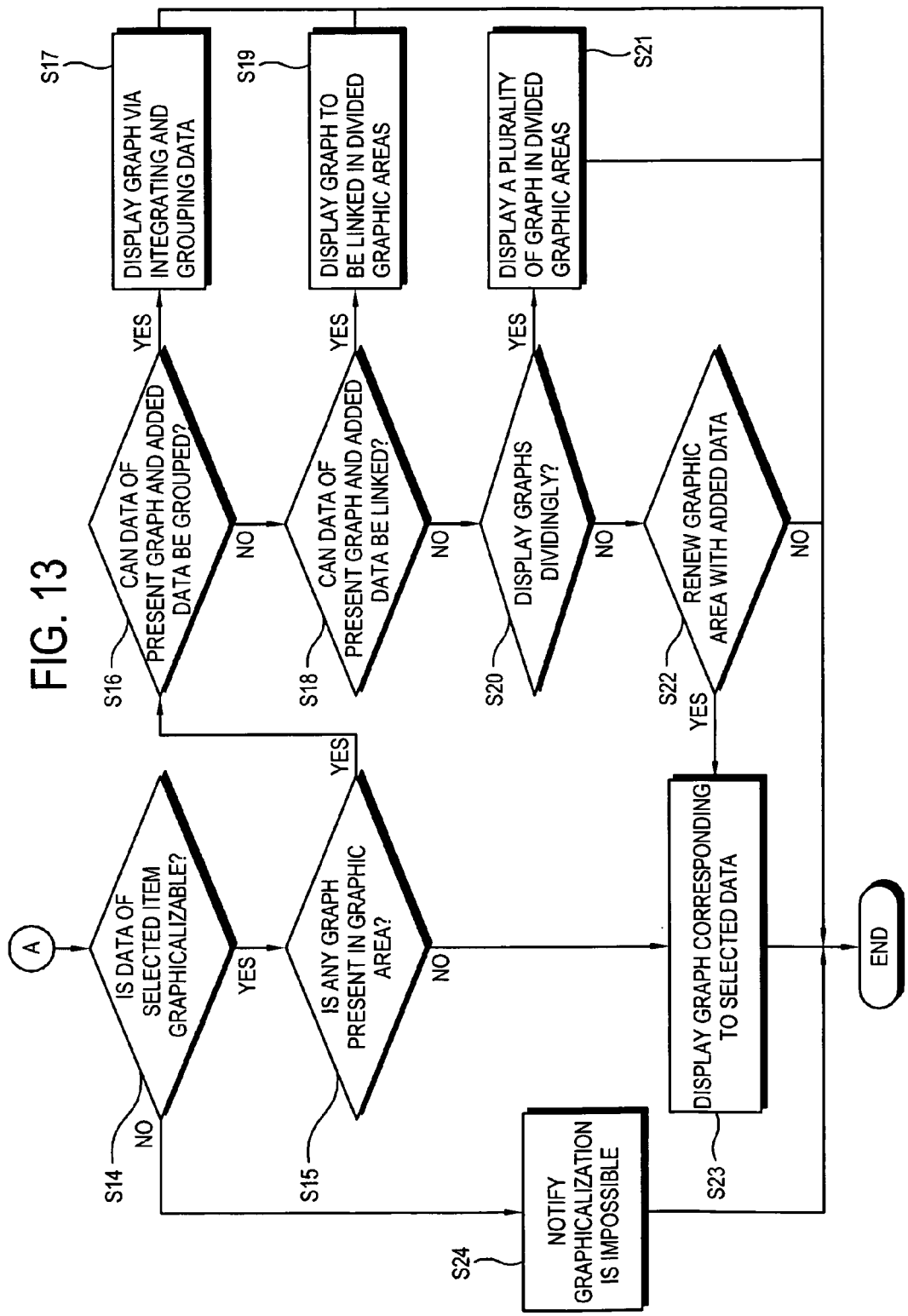

The first controller 150 determines whether a data of the item selected at S13 is graphicalizable (S14—FIG. 13). Here, the first controller 150 may load the conditional data on graphicalization (see Table 1) stored in the first storage unit 130 or the server 200 to determine to graphicalize.

If determining that graphicalization is possible at S14, the first controller 150 determines whether there is any graph in the graphic region 40 (S15).

If determining that there is a graph at S15, the first controller 150 determines whether the existing graph and the graph selected to be added to the graphic area at S13 can be grouped (S16). Here, the first controller 150 may load the conditional data on grouping and linking (see Table 2) stored in the first storage unit 130 or the server 200 to determine to group.

If determining that grouping is possible at S16, the first controller 150 controls the display 120 to group, i.e., integrate, the existing graph and the graph selected to be added at S13 and to display one graph in the graphic area 40 as shown in FIG. 7 (S17).

If determining that grouping is impossible at S16, the first controller 150 determines whether the existing graph and the graph selected to be added at S13 can be linked (S18). Here, the first controller 150 may load the conditional data on grouping and linking (see Table 2) stored in the first storage unit 130 or the server 200 to determine to group, as at S16, and stages S16 and S18 may be carried out simultaneously.

If determining that linking is possible at S18, the first controller 150 controls the display 120 to display the existing graph and the added graph to be linked in the divided areas 43 and 45 in the graphic area 40, respectively (S19).

If determining that linking is impossible at S18, the user may select whether to divide the graphic area 40 and to display the existing graph and the added graph in the divided graphic area 40 (S20).

If selecting the graphic area 40 to be divided at S20, the first controller 150 controls the display 120 to display the existing graph and the added graph in the divided areas 43 and 45 in the graphic area 40, respectively (S21). Here, the plurality of graphs displayed are not linked to each other unlike the graphs at S20.

If selecting the graphic area 40 is not to be divided at S20, the first controller 150 displays a message 60 to select whether to renew the current graphic area 40 with the graph of the data of the item selected to be added at S13, and the user selects whether to renew corresponding to the displayed message 60 (S22).

If selecting to renew the graphic area 40, the first controller 150 controls the display 120 to display the graph corresponding to the data of the item selected to be added at S13 in the graphic area 40 (S23).

Meanwhile, if determining there is no graph at S15, the first controller 150 controls the display 120 to display the graph corresponding to the data of the item selected to be added at S13 in the graphic area 40 (S23).

In addition, if determining the data of the item selected at S14 cannot be graphicalized, the first controller 150 controls the display 120 to display a message 50 informing the user of this (S24).

As described above, the host apparatus connected to an image forming apparatus and the information offering method thereof according to the present inventive concept provide a user with convenience in facilitating graph reprocessing and data expansion as the user needs with regard to a web solution or an application to control information of the image forming apparatus.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An information displaying method of a host apparatus which receives a data of at least one image forming apparatus, comprising:
   receiving a data of the image forming apparatus;
   displaying a User Interface (UI) screen including a data area displaying the data by item and a graphic area displaying a graph of the data in the data area;
   adding a data of an item in the data area to the graphic area;
   determining whether the data of the item added is graphicalizable; and
   graphicalizing and displaying the data of the item added in the graphic area based on the determined result,
   wherein the determining whether the data of the item added is graphicalizable comprises loading a conditional data on a preset graphicalization and determining on a basis of the loaded conditional data, and the conditional data is stored in a form of a table.

2. The information displaying method according to claim 1, wherein the data area displays the received data of the image forming apparatus as at least one column corresponding to the item, and the adding to the graphic area comprises transferring one of at least one column to the graphic area by drag-and-drop.

3. The information displaying method according to claim 1, further comprising:
   determining whether there is a graph in the graphic area; and
   determining whether the data of the item added and a data present in the graphic area can be grouped if a graph is present, based on a conditional data on grouping, wherein the displaying in the graphic area comprises displaying the present graph and a graph of the added data via integration if the data of the item added and the data present in the graphic area are groupable, and the conditional data on grouping is stored in a form of a table.

4. The information displaying method according to claim 3, wherein the displaying in the graphic area comprises selecting whether to divide the graphic area if the data of the item added and the data present in the graphic area are not groupable.

5. The information displaying method according to claim 4, wherein the displaying in the graphic area comprises dividingly displaying the present graph and the graph of the added data according to the selecting whether to divide.

6. The information displaying method according to claim 5, further comprising determining whether the data of the present graph and the added can be linked, wherein the dividingly displaying comprises displaying the present graph and the graph of the added data to be linked according to the determination result.

7. The information displaying method according to claim 6, wherein the determining whether the data of the present graph and the added data are groupable and linkable comprises loading a conditional data on a preset grouping and a preset linking and determining on a basis of the loaded conditional data.

8. The information displaying method according to claim 4, wherein the displaying in the graphic area comprises renewing the present graph to the graph of the added data and displaying according to the selecting whether to divide.

9. A host apparatus to control at least one image forming apparatus comprising:
   a user input unit input with selection by a user;
   a communication unit receiving a data of the image forming apparatus;
   a storage unit storing the data of the image forming apparatus;
   a display displaying a User Interface (UI) screen including a data area displaying the data by item and a graphic area displaying a graph of the data in the data area; and
   a controller determining whether a data of an added item can be graphicalized and controlling the display to display the data of the added item via graphicalization according to a determination result if receiving selection by a user that the data of the item in the data area is added to the graphic area,
   wherein the determining whether the data of the item added is graphicalizable comprises loading a conditional data on a preset graphicalization and determining on a basis of the loaded conditional data, and the conditional data is stored as in a form of a table.

10. The host apparatus according to claim 9, wherein the data area displays the received data of the image forming apparatus as at least one column corresponding to the item, and the user input unit selects to transfer one of at least one column to the graphic area via drag-and-drop.

11. The host apparatus according to claim 9, wherein the controller determines whether there is a graph in the graphic area, if a graph is present, determines whether the data of the added item and a data present in the graphic area can be grouped based on a conditional data on grouping and the conditional data on grouping stored as in a form of table, and if the data of the added item and the data present in the graphic area are groupable, controls the display to display the present graph and the graph of the added data via integration in the graphic area.

12. The host apparatus according to claim 11, wherein the controller controls the display to display a message to select whether to divide the graphic area if the data of the item added and the data present in the graphic area are not groupable.

13. The host apparatus according to claim 12, wherein the display dividingly displays the present graph and the graph of the added data in the graphic area according to selection of whether to divide.

14. The host apparatus according to claim 13, wherein the controller determines whether the data of the present graph and the added data can be linked and displays the present graph and the graph of the added data to be linked in the graphic area according to a determination result.

15. The host apparatus according to claim 14, wherein the storage unit stores a conditional data on a preset grouping and a preset linking, and the controller loads the conditional data on the preset grouping and the preset linking and determines whether the data of the present graph and the added data are groupable and linkable on a basis of the loaded conditional data.

16. The host apparatus according to claim 14, wherein the communication unit communicates with a server in which the data of the image forming apparatus is stored, and the controller controls the communication unit to load a preset conditional data on a grouping and a linking from the server and determines whether the data of the present graph and the added data are groupable and linkable on a basis of the loaded conditional data.

17. The host apparatus according to claim 12, wherein the display renews the present graph to the graph of the added data and display according to selection of whether to divide.

18. The host apparatus according to claim 9, wherein the storage unit stores a conditional data on a preset graphicalization, and the controller loads the conditional data on the preset graphicalization and determines whether the data of the item added is graphicalizable on a basis of the loaded conditional data.

19. The host apparatus according to claim 9, wherein the communication unit communicates with a server in which the data of the image forming apparatus is stored, and the controller loads a preset conditional data on graphicalization from the server and determines whether the data of the present graph and the added data are graphicalizable on a basis of the loaded conditional data.

20. The host apparatus according to claim 9, wherein the data area and the graphic area are overlapped.

21. The host apparatus according to claim 9, wherein the data area and the graphic area are adjustable.

22. An information display method of a data of an item for an image forming apparatus comprising:
    displaying a User interface (UI) screen on a display of a host apparatus connectable to the image forming apparatus including displaying the data of the item displaying a graph of the data;
    selecting a data of item; and
    determining whether the data of the item selected is graphicalizable;
    displaying the selected data of the item in a graphical visual form based on the determined result,
    wherein the determining whether the data of the item added is graphicalizable comprises loading a conditional data on a preset graphicalization and determining on the basis of the loaded conditional data, and the conditional data is stored as in a form of a table.

23. The information display method of claim 22, wherein the selecting the data of the item further comprising:
    selecting and moving the selecting data of the item to a predetermined area to display the selected data of item in the visual form.

* * * * *